AUTOMATIC ADAPTER UNIT FOR TELEPHONE INSTRUMENTS

Filed Nov. 8, 1963 2 Sheets-Sheet 1

INVENTOR.
Joseph H. Prager
BY
Paul A. Weilein
Attorney

May 9, 1967 J. H. PRAGER 3,319,003

AUTOMATIC ADAPTER UNIT FOR TELEPHONE INSTRUMENTS

Filed Nov. 8, 1963 2 Sheets-Sheet 2

INVENTOR.
Joseph H. Prager
BY
Paul A. Weilein
Attorney 3,319,003

AUTOMATIC ADAPTER UNIT FOR TELEPHONE INSTRUMENTS

Joseph H. Prager, North Hollywood, Calif., assignor of forty percent to Nichimen Co., Ltd., Tokyo, Japan, a corporation of Japan Filed Nov. 8, 1963, Ser. No. 322,432
8 Claims. (Cl. 179—1)

The present invention relates generally to the art of communication, and is more particularly concerned with an adapter unit for converting a conventional telephone instrument for control and operation in association with auxiliary apparatus.

As exemplary of a variety of types of auxiliary apparatus with which the adapter unit of the present invention may be utilized, automatic dialing devices, and automatic answering and recording devices may be mentioned particularly.

Considered in its broad concept, the present invention has for an object the provision of a self-contained adapter unit which may be removably installed on a telephone instrument of a publicly owned telephone system, without violation of presently established rules and regulations.

A further object is to provide a separate independent adapter unit which may be removably attached to a conventional dial type telephone instrument to provide all the necessary operative functions required by the associated auxiliary apparatus, without the necessity of utilizing physically connected tie-in wires with the telephone instrument or the communication line circuit.

Still another object is to provide an adapter unit of attractive and pleasing appearance, which may be removably seated on the telephone cradle in proper cooperative relationship therewith to dispose devices in the adapter in proper operative relationship with respect to certain components of the telephone instrument, and wherein the adapter unit forms the support for the handset of the telephone instrument.

Further objects of the invention will be brought out in the following part of the specification, wherein detailed description is for the purpose of fully disclosing the invention without placing limitations thereon.

Referring to the accompanying drawings, which are for illustrative purposes only:

Figure 5:
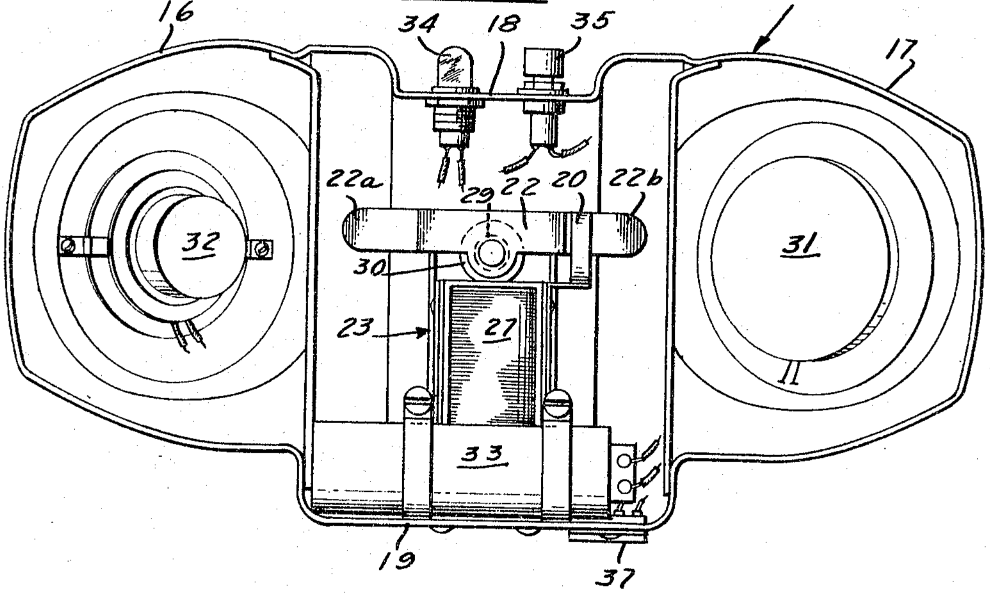
Figure 7:
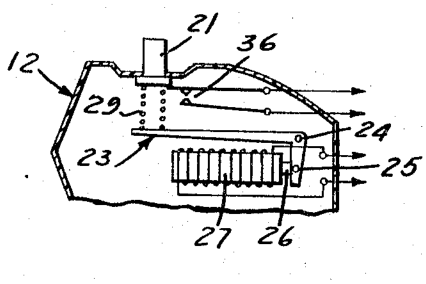

FIG. 5 is a bottom plan view ... diagrammatically and schematically showing the ... showing a modi- ... illustraare provided with activating switchmeans operable by
pair of spaced actuating pins (not shown) on the cradle.
These pins are engageable by the handset when it is placed
on the cradle, the weight of the handset serving to move
the activating switch to a non-activating position, and
when the handset is removed from the cradle, the activa-
ing switch automatically moves to an activating positio
In the conventional dial type telephone instrument, t
number is dialed through the use of a manually opera
dialing disc. It is also generally known that it is poss
with the handset removed from the cradle, to dial a
ber by successively depressing the activating switch c
pins so as to produce the grouped pulses of a desire
ber. As will hereinafter be explained more ful
principle is utilized in the adapter of the present i
for accomplishing automatic dialing operations,
necting and disconnecting the telephone instr
automatic answering and recording use with aux
nected devices.

Figures 1, 3:
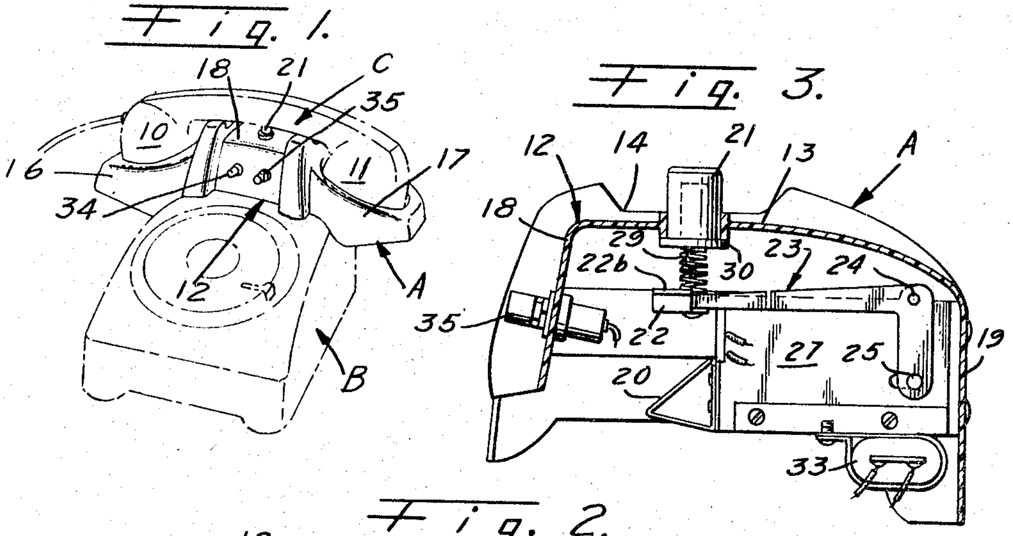
FIG. 1 is a perspective view showing the adapter unit of the present invention as being applied to a conventional telephone instrument.
FIG. 3 is a transverse section through the unit to show the cooperative relationship between certain of the components therein, taken substantially on line 3—3 of FIG. 2.
Figure 2:
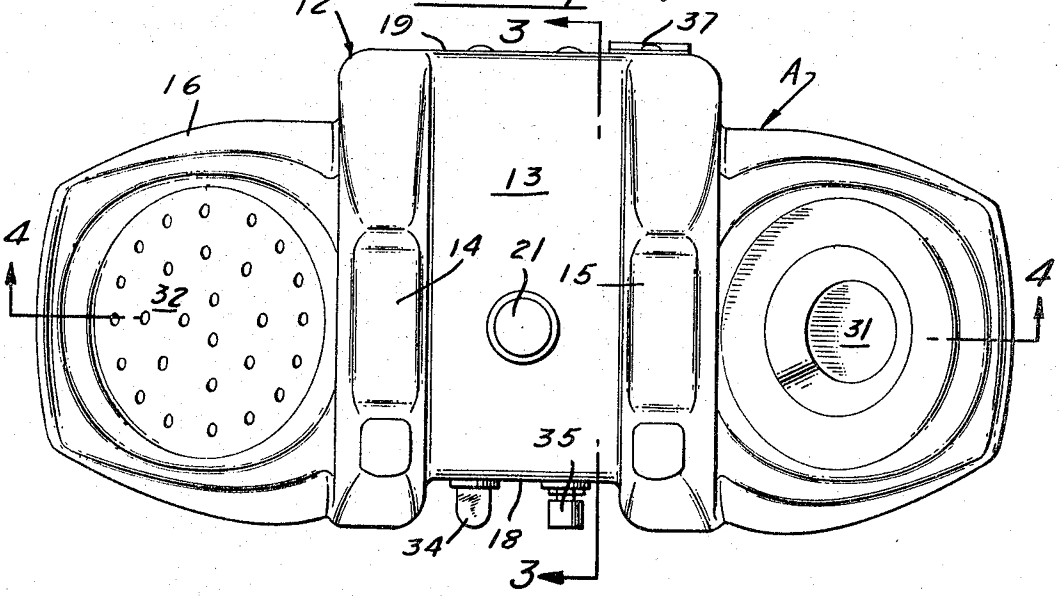
FIG. 2 is an enlarged plan view of the adapter unit.
Figure 6:
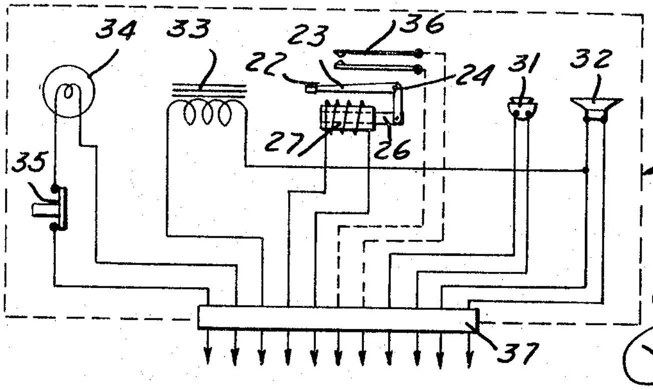
Figure 4:
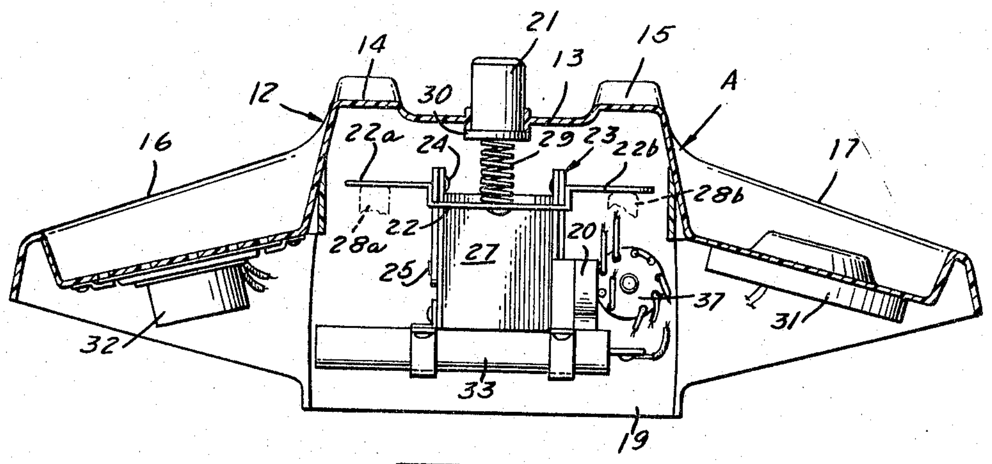
FIG. 4 is a longitudinal section taken substantially on line 4—4 of FIG. 2, certain of the parts being shown in full lines.

The adapter of the present invention comp
like housing, as generally indicated by the
which may be molded or otherwise formed
other suitable material to provide an open
ture containing a central platform portion
spaced cradle forming supports 14 and 15
port the telephone handset in lieu of the
the instrument. As thus supported, th
and earpiece 11 will be positioned respe
sides of the platform portion 13 and s
lying end extensions or wings 16 and
The shell-like housing 12 is sha
edges to generally interfittingly con
of the adjacent wall structure of the
ture B, and with the central platfo
vided with a front panel or wall
wall 19 arranged to overlie adja
ment cradle structure. As thus
may be removably applied to
instrument and latchingly secu
riorly mounted spring clip 20
portion of the cradle structu
ventional telephone instrume
A push-button 21 is mou
portion 13 between the spa
so as to be engaged and
handset seated on the cra
As shown in FIG. 4, the
the central portion of ar
by the outermost end of
pulsing lever 23 pivote
pivotal axis 24, the ot
at its outermost end
with a solenoid 26
an actuating coil 27
The elongate ba
22b so positioned
ing switch pins 2
instrument, as sh
compression sp
most end of th
22, this spring
towards its ...ossible to inde-
...the pins 28a and 28b
...ated activating switch to move
...sition. This is accomplished by ener-
...oil 27. Such action can be utilized in con-
...on with auxiliary dialing apparatus for pulsing the
...ctivating switch to provide a desired coded dial signal,
... in connection with answering and recording apparatus
... activating and non-activating the telephone instru-
...nt.

...he unit is provided with a built-in pickup microphone
...which is positioned in the wing 17 so that it will
...lie the earpiece 11 of the handset. This pickup
...hone finds use in both automatic dialing arrange-
... and in answering and recording installations. In
... of automatic dialing, connections would be made
...ernal speaker which will indicate the aural condi-
...he call which is being made. When the call
... busy connection or is completed, it will be
...he remote speaker, and at that time the call
...er cancelled if busy, or the handset may be
... the call completed.

... unit is to be utilized with automatic recorder
... auxiliary apparatus, the unit will be pro-
...uilt-in speaker 32, this speaker being posi-
...ing 16 of the housing so as to underlie
... 10. The function of the speaker 32 is
...ssages, while the pickup microphone 31
... the incoming messages. The primary
...lsing lever 23 in this case is to control
...cling.

... for activating an associated record-
... in the adapter a ring sensing coil
... being placed in the rear portion of
... in a position where it will be in-
...th the ring mechanism within the
...e structure B.

...lso provided with an incoming
...ch would be connected into the
... automatic telephone recorder
... indicating means includes a
... normally closed push-button
... in a conveniently accessible
... of the housing. The indi-
...ation of the recorder appa-
... indicate an incoming call
... call has been made and
...h-button switch 35, the
... its "off" position ready
...

...r example when a [illegible]
...ction with [illegible]
...36 [illegible]
... automatic re-
... may be provided
...G. 7, these contacts
...ment of push-button
... position when the
...virtue of removing
...en the handset is
...e adapter.

...ons of all the
...t to a common
...vall 19 of the
...lient of utiliz-
... may be elec-
...liary device
...he adapter
...cling, and
...he neces-
... the tele-
... adapter
...nal use
...or the ...hose
... my invention, and hence, I do not wish to be restricted to the specific form shown or uses mentioned, except to the extent indicated in the appended claims.

I claim:

1. An adapter unit for a dial telephone having a handset and receiving cradle therefor, the cradle being arranged with an activating switch control pin, comprising: a housing of shell-like construction adapted to removably seat on the telephone cradle, said housing having a central platform portion arranged in the seated position to overlie the cradle switch pin and removably support the telephone handset thereon; housing end portions extending from said central portion adapted to occupy positions respectively adjacent earpiece and mouthpiece ends of the supported telephone handset; means operable under the weight of the handset on said platform for normally moving said pin to actuate said switch to a non-activating position; and means acting on said weight operable means and electrically energizable to independently actuate said switch to an activating position while the handset is on the platform.

2. An adapter unit for a dial telephone having a handset and receiving cradle therefore, the cradle being arranged with an activating switch control pin, comprising: a housing of shell-like construction adapted to removably seat on the telephone cradle, said housing having a central platform portion arranged in the seated position to overlie the cradle switch pin and removably support the telephone handset thereon with its earpiece end on one side and its mouthpiece end on the other side; housing end wings respectively to closely underlie the earpiece and mouthpiece; a pickup microphone mounted in the end wing associated with the handset earpiece; means operable under the weight of the handset on said platform for normally moving said pin to actuate said switch to a non-activating position; and means acting on said weight operable means and electrically energizable to independently actuate said switch to an activating position while the handset is on the platform.

3. An adapter unit for a dial telephone having a handset and receiving cradle therefor, the cradle being arranged with an activating switch control pin, comprising: a housing of shell-like construction adapted to removably seat on the telephone cradle, said housing having a central platform portion arranged in the seated position to overlie the cradle switch pin and removably support the telephone handset thereon with its earpiece end on one side and its mouthpiece end on the other side; housing end wings respectively to closely underlie the earpiece and mouthpiece; a pickup microphone mounted in the end wing associated with the handset earpiece; an electrically energizable speaker mounted in the other end wing associated with the handset mouthpiece; means operable under the weight of the handset on said platform for normally moving said pin to actuate said switch to a non-activating position; and means acting on said weight operable means and electrically energizable to independently actuate said switch to an activating position while the handset is on the platform.

4. An adapter unit for a dial telephone having a handset and receiving cradle therefor, the cradle being arranged with an activating switch control pin, comprising: a housing of shell-like construction adapted to removably seat on the telephone cradle, said housing having a central platform portion arranged in the seated position to overlie the cradle switch pin and removably support the telephone handset thereon; housing end portions extending from said central portion adapted to occupy positions respectively adjacent earpiece and mouthpiece ends of the supported telephone handset; means operable under the weight of the handset on said platform for normally moving said pin to actuate said switch to a non-activating position; means acting on said weight operable means and electrically energizable to independently actuate said switch to an activating position while the handset is on the platform; electrical indicating means on the form portion having an energizing circui operable switch for controlling said ci being operable from the front of said pl 5. An adapter unit for a dial telephoi set and receiving cradle therefor, the ranged with an activating switch control a housing of shell-like construction adap seat on the telephone cradle, said housin platform portion arranged in the seated lie the cradle switch pin and removably phone handset thereon; housing end p from said central portion adapted to respectively adjacent earpiece and mouth supported telephone handset; means op weight of the handset on said platform f ing said pin to actuate said switch to a nc tion; circuit controlling contacts actuate the operation of said means; and mea weight operable means and electricall independently actuate said switch to ac activating positions while the handset is 6. An adapter unit for a dial telephor set and receiving cradle therefor housing and the cradle being arranged with an control pin, comprising: a housing of sl tion adapted to removably seat on the said housing having a central platform in the seated position to overlie the crad removably support the telephone handset end portions extending from said central to occupy positions respectively adjac mouthpiece ends of the supported te means operable under the weight of the platform for normally moving said pi switch to a non-activating position; pick housing having inductively coupled con ringing device; and means acting on saic means and electrically energizable to in ate said switch to an activating position is on the platform.

7. An adapter unit for a dial telephon set and receiving cradle therefor, the ranged with a telephone activating sw comprising: a housing of shell-like cons to removably seat on the telephone crad n the seated d removably ing end por- apted to oc- and mouth- et; a movable r engagement d member in n; a compres- nd said mem- e handset en- a non-activat- he handset to on; and means energizable to the action of thereby move having a hand- adle being ar- in, comprising: g a central plat- rt the telephone positely extend- occupy positions mouthpiece ends central portion; using in a seated e central portions ; means operable said platform for said switch to a ing on said weight zable to independ- and non-activating latform.

xaminer

ENTS

| | |
|---|---|
| ---------- | 179—1 |
| ---------- | 179—1 |
| ---------- | 179—1 |

*ary Examiner.*

*stant Examiner.*